March 4, 1941.    E. R. RAMSEY    2,233,641
PULP TREATMENT
Filed Feb. 9, 1937    4 Sheets-Sheet 2

INVENTOR
ELMER R RAMSEY,
BY Arthur Middleton
ATTORNEY.

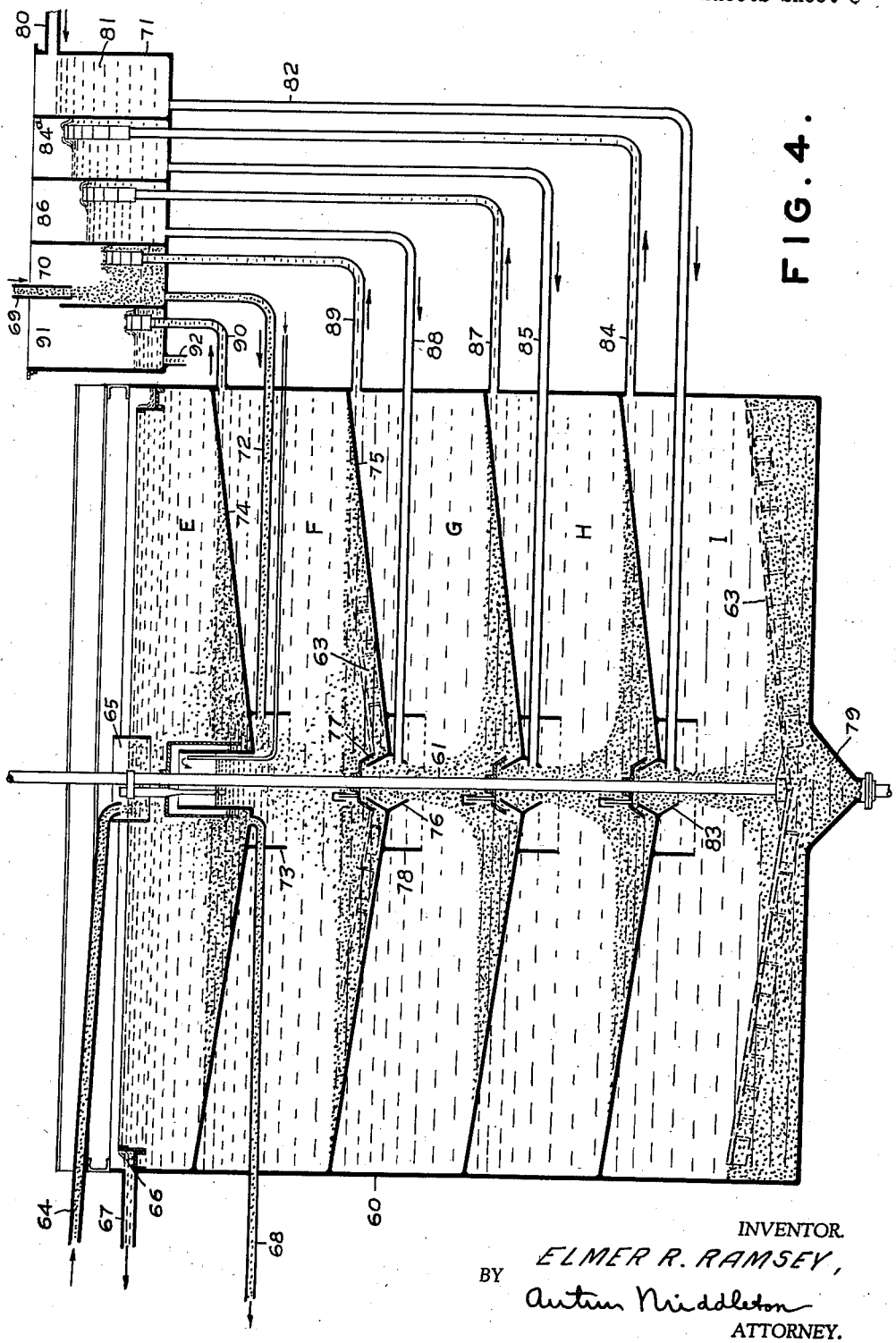

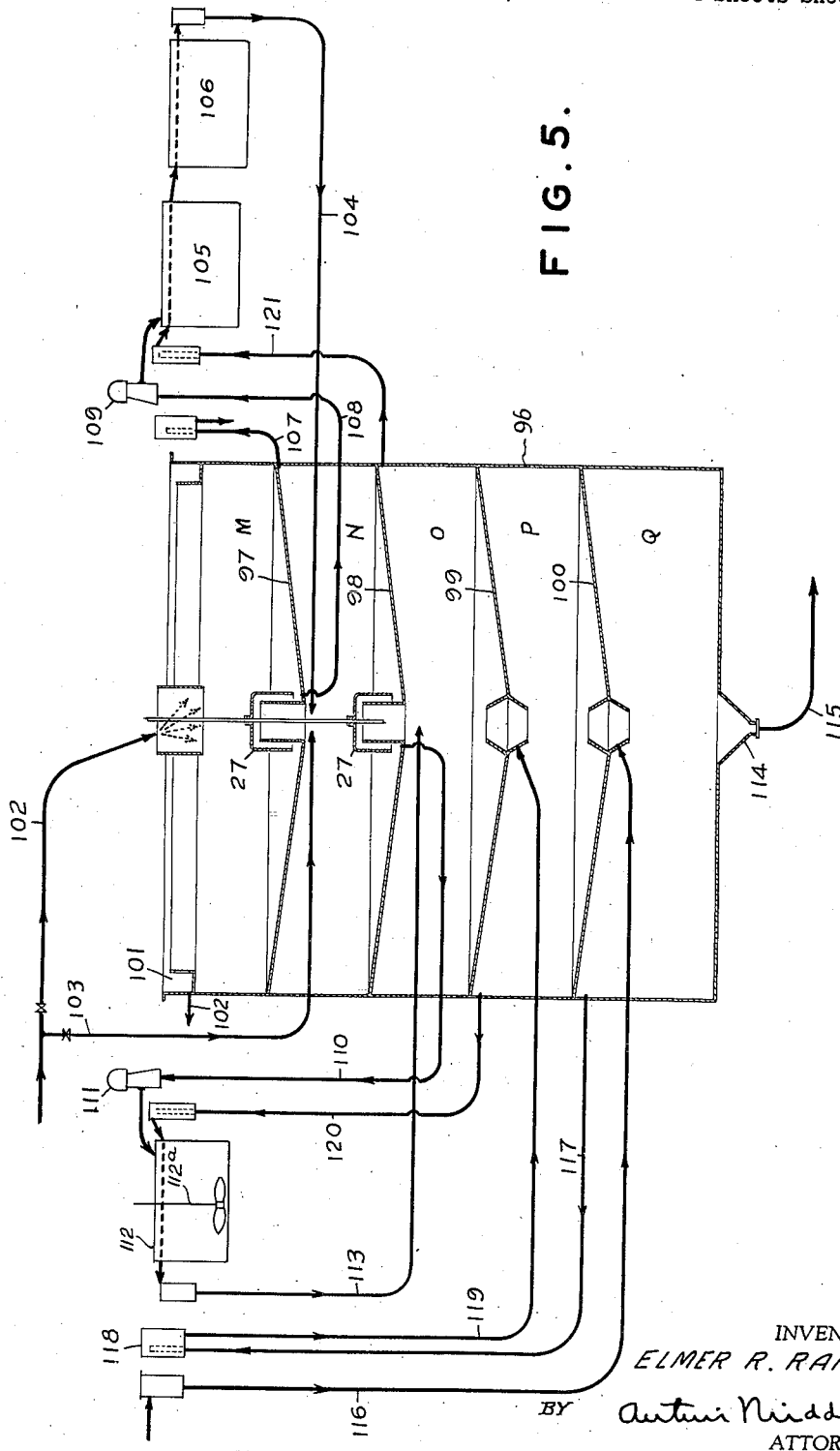

Patented Mar. 4, 1941

2,233,641

UNITED STATES PATENT OFFICE 2,233,641

PULP TREATMENT

Elmer R. Ramsey, Larchmont, N. Y., assignor to The Dorr Company, Inc., New York, N. Y., a corporation of Delaware Application February 9, 1937, Serial No. 124,948

8 Claims. (Cl. 210—55)

This invention relates to the treatment of pulps and more particularly to improved methods of and apparatus for treating pulps.

The invention contemplates improved methods for the thickening and counter-current decantation or washing of metallurgical and other pulps and novel and improved apparatus for use in such operations.

Throughout this specification and the appended claims the term pulp is intended to define any mixture of solid material and a liquid. In the industrial arts, and more especially in chemical and metallurgical industries, pulps are subjected to various types of treatment. Thus, for example, the treatment may involve the removal or separation of the solid material from the liquid, or the treatment may involve the separation by solution in the liquid of a valuable element or elements from worthless or less valuable substances contained in the solid material, or the treatment may involve washing of the solid material to free it from liquid containing dissolved substances. The present invention is particularly concerned with treatment processes of this character, but it is to be understood that the invention is not limited in its application to the particular types of treatment specified above.

The present invention is of particular advantage in the treatment of pulps wherein there is involved what is known in the art as primary thickening followed by continuous counter-current decantation. The latter operation, in one of its aspects, may be defined as a system of washing finely divided solids, such as chemical precipitates, finely ground ore gangues and the like, free from liquids containing dissolved materials. It also is applied to lixiviation or leaching wherein the leaching liquor is passed continuously through a series of zones into which the material to be leached is introduced in such manner that the liquor highest in content of dissolved material contacts the solids highest in content of the same, while liquor substantially free from dissolved material is added to the zone containing the solids from which the material to be dissolved has been nearly exhausted.

Many other applications of the principles of continuous counter-current decantation are known in the industrial arts, such as the washing of chemical precipitates, crystals, etc., and the carrying out of chemical reactions, such as those representing the manufacture of caustic soda from soda ash and lime, the manufacture of alum from bauxite and sulphuric acid, the manufacture of borax from Colemanite, the manufacture of barium carbonate from barium sulphide and soda ash, the manufacture of phosphoric acid from rock phosphate, the extraction of iron stains from barytes, etc. In all such treatments of pulps involving continuous counter-current decantation, the present invention is of special advantage.

For the purpose of description specific embodiments of the present invention will be hereinafter particularly described in connection with the leaching or cyaniding of gold and silver ores for the extraction of the precious metal content thereof. It is to be understood, however, that the invention is particularly described in connection with this kind of pulp treatment by way of example only, and those skilled in the art will readily recognize the application of it to such other processes of pulp treatment as hereinbefore mentioned and the advantages of the invention resulting from such applications.

In most cyanide plants the pulp coming from the mill or grinding circuit is subjected to a primary thickening operation frequently in a thickener of the well-known Dorr type followed by a counter-current decantation treatment in a series of smaller thickeners and agitators or in a so-called tray type washing thickener comprising a tank provided with a plurality of superposed thickener compartments.

It is an object of the present invention to provide a method for the continuous thickening and counter-current decantation of pulps that is highly efficient and at the same time that may be carried out in apparatus having a maximum of compactness and space conserving characteristics.

Another object is to provide an apparatus which combines the primary thickening and the counter-current decantation stages in a single compact unit.

A further object is to provide a tray type of pulp treating apparatus having one or more of the thickening compartments positively sealed with relation to other compartments such as decantation compartments, so as to have the thickening compartments function as separate or independent thickening or sedimentation stages.

Still another object of the invention is to provide a means for positively and efficiently sealing a compartment or compartments of a tray type thickener from others thereof and which means, at the same time, will permit free and ready functioning of associated sludge raking structures.

A still further object is to provide a seal between two superposed compartments which will become ineffective when the liquid level in the lower compartment fails to afford partial support for the tray separating the two compartments.

With these and other objects in view, the invention consists in the method and construction and novel combination and arrangement of parts hereinafter fully described, illustrated in the accompanying drawings, and set forth in the claims hereto appended, it being understood that various changes in the procedure, form, proportion and minor details of construction, within the scope of the claims, may be resorted to without departing from the spirit of the invention, or sacrificing any of the advantages thereof.

In the drawings:

Figure 4 is a flow sheet showing diagrammatically a method, constituting a part of the present invention, for the thickening and counter-current decantation of pulps in which the apparatus of Figures 1 and 2 is of particular applicability.

Figure 5 is a flow sheet showing diagrammatically a modified method in which a thickener provided with the mechanism of Figure 3 is especially advantageous.

Figure 1:
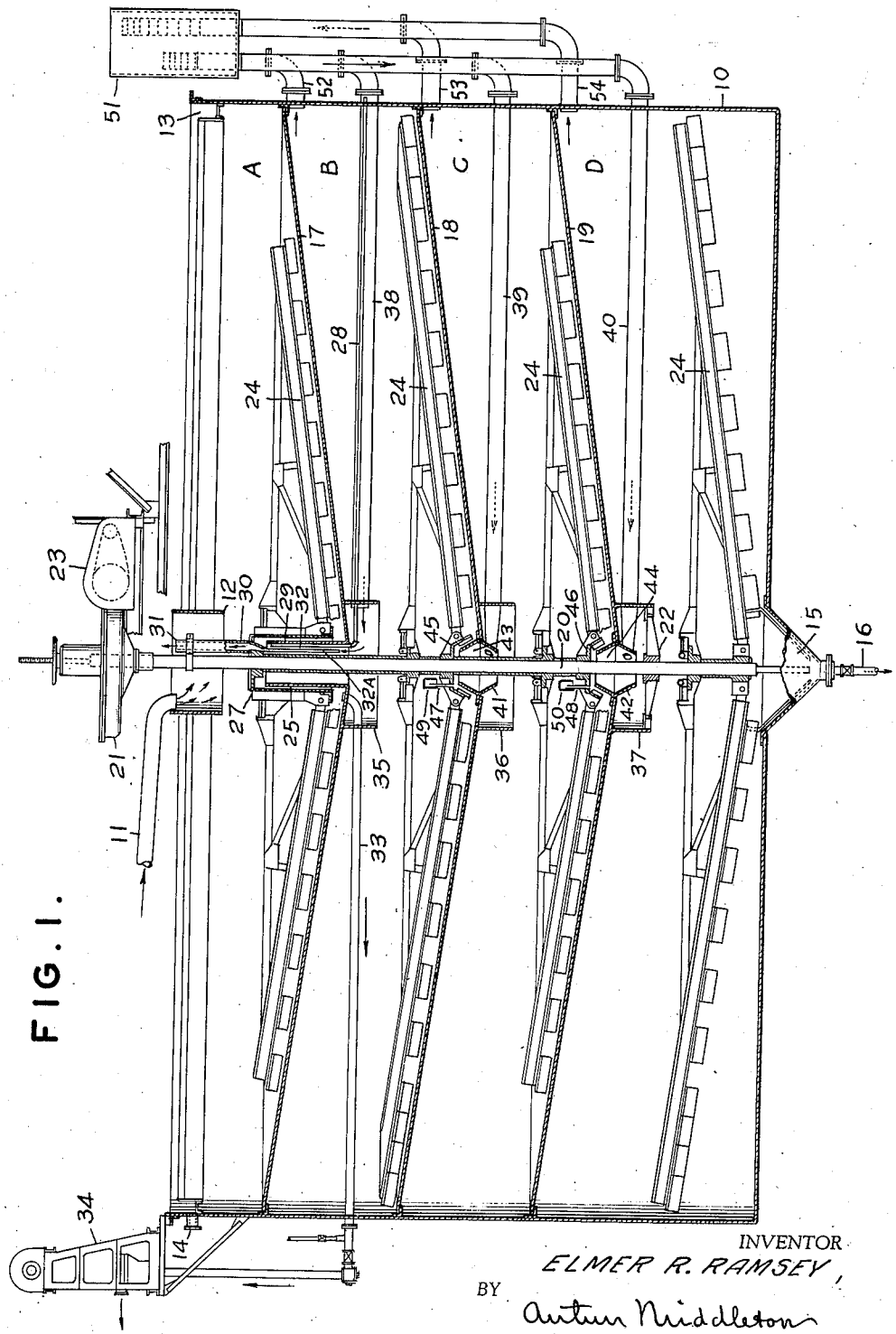
Figure 1 is a vertical section through a tray type thickener having embodied therein features of the present invention.

The apparatus of the present invention in one embodiment, may be described as a multiple tray type thickener having a top compartment entirely sealed or separated from other compartments by an air seal at the center of the tray. This seal is made by having a boot at the center of the tray extending upward to the top casing of an air seal cage. Air is introduced into the space between the cage and the boot and forms the seal between the compartments and prevents the solution from overflowing the boot into the top compartment. An air release pipe extends upward above the solution level in the top compartment and a slot for air release prevents the solution from being forced below the required solution level in the boot.

An important point of control in connection with the maintenance of the seal is to be able to vary the air pressure within the seal to any desired point where this air pressure is in turn balanced to a desired height of overflow column of the compartment immediately beneath the sealed compartment and where this air pressure in turn balances the pressure produced from a fixed height of pulp of a desired density in the compartment wherein the seal is located.

Other compartments are separated by means of a seal which is made by having a boot at the center of the tray extending into an inverted cup which is part of the rake arm spider of the mechanism above the tray. Solids which settle upon the tray must flow over this boot and up into the cup of the spider before passing down into the next lower compartment. This combination of upward boot, inverted cup and the thickened pulp forms the seal between the compartments. In order to prevent entrapped air from collecting underneath the inverted cup, an air relief pipe is connected into a small hole drilled through the spider cup.

The top compartment functions as a primary thickener and the succeeding compartments as a counter-current decantation series for washing. The top compartment overflow is recovered as strong solution and is fed by suitable means to any desired point to be processed in order to recover the material in solution. The underflow is pumped out for agitation or other treatment and then returned to the next lower compartment, or to the upper washing or decantation tray where the solids pass in a downward direction successively through the remaining washing or decantation trays, being washed in each compartment or tray below the second in a continually weaker solution and finally in water. The water which is introduced into the bottom compartment or tray passes upwardly successively through the compartment or trays and thus in a direction counter-current to the movement of the solids. The solids are thus subjected to the action of a washing agent which increases in content of dissolved material in its passage upwardly. The solution thus gains strength at each successive step upward until it finally overflows the second compartment as weak liquor and is fed to a suitable point to be processed to recover the material dissolved therein.

Referring to the drawings in detail, the reference numeral 10 designates a cylindrical tank of metal or other suitable material provided with an inlet pipe 11 for the material to be treated communicating with a central feed well 12, a peripheral overflow launder 13 and overflow discharge pipe 14 and having a central cone shaped sump 15 for the discharge of settled sludge through the valved sludge outlet pipe 16. In the present embodiment the tank 10 is shown as divided into four superposed compartments A, B, C and D separated from one another by the diaphragm-like members or trays 17, 18 and 19 which may be flat or horizontal but are preferably sloped toward the center. For the purpose of illustration, four compartments are shown but it is to be understood that the tank may be provided with any desirable number of the same. Extending downwardly and vertically through aligned openings in the centers of the trays is a rotatable shaft 20 supported in the stationary drive-head 21 and the steady bearing 22 and adapted to be rotated at a suitable speed through the medium of drive mechanism 23 mounted upon a fixed structure above the tank.

The shaft 20 has affixed thereto the sludge rakes or scraping members 24 arranged to rotate with the shaft and convey or impel settled solids along the upper surfaces of the trays 17, 18 and 19 and in the bottom compartment D toward the central openings of the trays and eventually into the discharge sump 15, all in a well known manner.

In a broad aspect, one of the features of the invention is embodied in a tray type thickener which has a number of superposed hydraulically intercommunicating compartments forming a counter-current decantation series and surmounted by an uppermost compartment which is positively sealed, in any suitable manner, from the counter-current decantation series so as to serve as a primary thickening stage to allow the withdrawal of sludge from the apparatus for treatment or otherwise.

Figure 2:
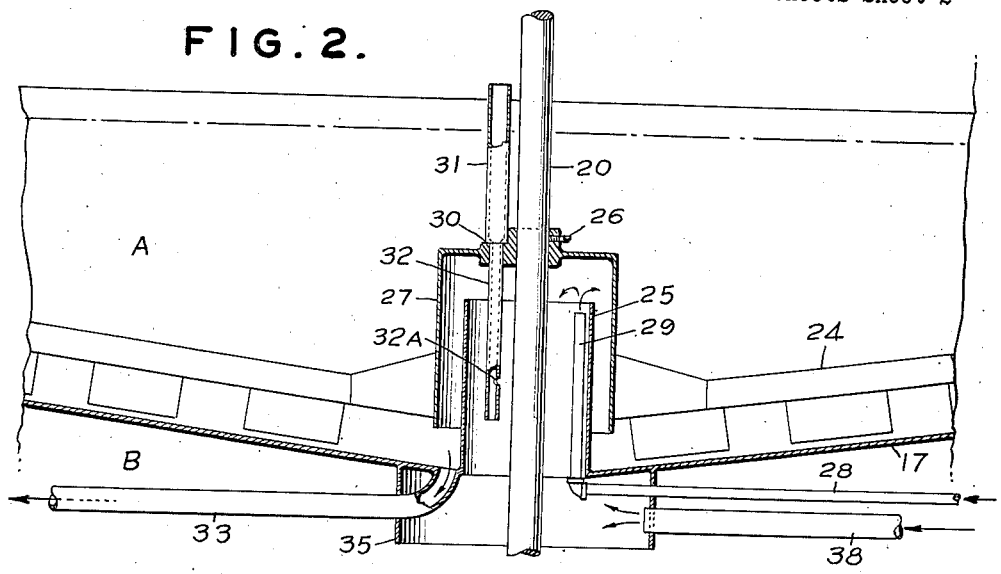
Figure 2 is an enlarged sectional view through the top compartment of the thickener of Figure 1 showing in detail the preferred means for sealing this compartment from the others.

In the present embodiment the compartment A is positively sealed from the compartment B comprising the first stage of the counter-current series by means of a novel air seal arrangement shown in Fig. 1 and in detail in Fig. 2.

The tray 17 is provided at its central opening with an upstanding boot 25 which is rigidly and stationary affixed at the edges of the central opening. Fixed to the raking structure 24 and forming a part thereof and also fixed to the shaft 20 by means of the set screw 26 is an inverted boot or cage 27 cylindrical in form and slightly larger in diameter than the upstanding boot 25. The cage 27 extends downwardly and surrounds the boot 25 throughout the greater portion of its extent and, being fixed to the shaft 20, rotates around the stationary boot 25 when the raking structure is in operation. An air supply pipe 28 extends through the tank wall traversing the compartment B, is elbowed and terminates in an upstanding discharge section 29 located within the boot 25 and having its discharge opening adjacent the upper extremity of the boot. Extending downwardly through the cage 27 and rigidly secured thereto is an air release pipe 30 having an upper portion 31 of larger diameter than the lower portion 32. The lower portion 32 of the release pipe extends downwardly throughout the greater depth of the boot 25 and is provided somewhat above its lowermost extremity with a perforation or port 32A for a purpose which will be hereinafter described. The upper portion 31 extends upwardly above the highest liquid level of the tank.

Since the pipe 30 rotates with the raking structure and cage 27, it must be positioned with respect to the stationary pipe section 29 so that its rotation will not be interfered with. In operation of the device, compressed air is forced through the supply pipe 28 and upstanding section 29 into the space above and around the sides of the upstanding boot 25 provided by the nested or cupped arrangement of the boot and the cage 27. It is understood that the apparatus is filled with a solids-liquid mixture or pulp and the air is continuously supplied under sufficient pressure to force down the level of the pulp which tends to rise up into the boot 25 from the compartment B. The air release pipe 30, however, is provided to prevent the pulp level from being forced too low. It will be seen that the pulp within the boot 25 will be forced down to the port 32A in the section 32 of the release pipe and the air will then escape through said port and the pipe 30 to the atmosphere, thus maintaining the liquid level at all times substantially even with the port 32A. It will be seen that the space within and around the upstanding boot 25 will be maintained filled with air confined by the inner walls of the cage 27, so that the level of the pulp in the space between the boot 25 and the cage 27, and the level of the liquid in the boot 25 cannot rise above the upper end of the boot 25.

There is thus provided a most effective seal for maintaining the thickening compartment A completely separate from the other compartments while at the same time the function of the raking structure is not interfered with and in this type of seal, the disadvantages incumbent upon the use of seals such as packing glands and the like with their susceptibility to the corrosive action of strong liquors and abrasive action of gritty solids are not present.

As hereinbefore explained, in the embodiment shown in Figs. 1 and 2, the invention resides in an apparatus having a plurality of superposed compartments, the uppermost one of which is completely sealed from the others and constitutes a primary thickening stage, while the other compartments below the top one, of which there may be any desired number, serve as a counter-current decantation or washing series.

In operation, a solids liquid mixture is fed through the pipe 11 into compartment A, where the solids fall on the tray 17 and the supernatant liquid collects in the peripheral overflow launder 13 and passes therefrom through the pipe 14 to be processed. The solids are raked by the raking member 24 toward the center of the tray 17 and are continuously or intermittently withdrawn through the valved pipe 33 by means of the pump 34 to any point for treatment before being fed to the superposed washing compartments B, C and D for treatment. The compartments B, C and D are provided with the centrally-disposed feedwells 35, 36 and 37 which depend from the under side of the partitions or trays 17, 18 and 19, respectively. A feed pipe 38 extends through the side of the tank and communicates with the feedwell 35, discharging directly into the feedwell to form the means of supply for compartment B. Washing solution for the other compartments C and D is brought in through pipes 39 and 40, which extend through the feedwells 36 and 37 and discharge directly into inverted frustro-conical boots 41 and 42 so as to thoroughly mingle and mix with the pulp travelling downwardly from the next higher compartment.

Compartments B and C at the central openings thereof are provided with upstanding frustro-conical shaped boots 43 and 44 extending into the inverted cup members 45 and 46, which are attached to the vertical shaft 20 and form a part of the rake arm spider mechanism. Thus thickened pulp or solids which have settled upon the trays 18 and 19 must flow over the boots 43 and 44 up into the cups 45 and 46 before passing down into the next lower compartment.

In order to prevent entrapped air from collecting underneath the inverted cups 45 and 46 and thus interfere with the free transfer of sludge from one compartment to the other, air relief pipes 47 and 48 are connected into small holes drilled through the cups 45 and 46, respectively. These air relief pipes have rigidly attached thereto the cap members 49 and 50 to provide small air pockets into which any entrapped air may escape. Thus any entrapped air may escape upwardly through the pipes 47 and 48 into the space within the caps 49 and 50 and thence bubble out of the caps and through the liquid to the atmosphere or become dissolved in the liquid. The pockets afforded by the caps 49 and 50 insure that there will be little tendency for sludge to back up through the release pipes 47 and 48 or for liquid to short-circuit by flowing downwardly through the air-relief pipes.

An overflow and solution feed box designated generally as 51 is provided and the same is suitably divided into a plurality of solution and overflow sections. Each of the supply pipes 38, 39 and 40 is connected to an appropriate feed section of the box 51 and the compartments B, C and D are provided with supernatant removal or overflow pipes 52, 53 and 54, respectively, each communicating with an appropriate overflow compartment of the box 51.

One manner of operation of the apparatus just described will be seen in the flow sheet of Fig. 4 which illustrates a method for the thickening and counter-current decantation of pulps in a gold or silver cyanidation operation in which apparatus of the type of this invention is of particular value. In the method hereinafter described, it is understood that a diagrammatic showing of apparatus of the type of the present invention is used as a convenient means of illustrating the novel method, it being obvious that other types of apparatus might be employed so long as there are a plurality of superposed thickening zones or stages, at least one of which is completely sealed from the others so as to function as an independent primary thickener.

To illustrate the method there is shown a tank 60 divided into five superposed compartments E, F, G, H and I and having the vertical centrally-disposed rotatable drive shaft 61 carrying and actuating the sludge-raking or -conveying structures 63, it being understood that each compartment is provided with a suitable raking structure 63. The uppermost compartment E serves as an independent primary thickening stage and is sealed from the compartment F and all succeeding compartments in any appropriate manner, the novel sealing arrangement of the present invention being shown as a convenient means of illustration.

The original feed comprising a pulp of finely-divided ore and cyanide solution enters the primary thickening compartment E through the supply pipe 64 and feedwell 65. In this compartment a primary thickening or sedimentation operation is effected, substantially clear pregnant solution overflowing into the launder 66 and being conducted therefrom by the pipe 67 to a processing operation for effecting the recovery therefrom of dissolved values. The sludge or solids which settle in the compartment E are raked or conveyed toward the center thereof and continuously or intermittently removed through the pipe 68 by pumping or otherwise and conducted to one or more agitators wherein the pulp is subjected to dissolving action for a suitable time interval to increase the dilution of the withdrawn sludge by the addition thereto of diluting solution.

After the agitating operation the sludge or solids are fed through pipe 69 into a compartment 70 of a distributing tank 71. The compartment 70 has an outlet pipe 72 which passes through the wall of a feedwell 73 located at the central portion of the under side of the tray 74 separating the chamber E from the chamber F. Each of the compartments F, G, H and I is filled with washing fluid.

The sludge and diluting or washing solution fed into the chamber F is subjected to sedimentation and the solids gradually settle on and near the tray 75 forming the bottom of the chamber F. The sludge raking structure 63 rakes or moves the settled solids toward the center of the tray and between the frustro-conical boot 76 and inverted cup member 77 where it is guided into the feedwell 78 at the upper central portion of the chamber G.

This action is repeated in the chamber G and successively in the chambers H and I. After being subjected to the action of the washing fluid in the chamber I, the sludge or solid is spent and is raked into the cone-shaped sump 79, from which it may be drawn for disposal in any suitable manner.

The washing fluid flows from pipe 80 into a compartment 81 in the distributing tank 71. An outlet pipe 82 from such compartment is led through the wall of the tank into the chamber I and through the wall of the frustro-conical boot 83, where it mingles with the stream of sludge passing therethrough from the chamber H. Such washing fluid further dilutes the already-impoverished solution discharged with the solids from the preceding compartment H, and there is a flow of such fluid from the chamber I through the pipe 84 to a compartment 84a in the distributing tank 71.

From the compartment 84a the now partially enriched washing or leaching fluid passes into the chamber H through the pipe 85 and thence from such chamber to a compartment 86 in the distributing tank 71 through a pipe 87. From the compartment 86 the fluid passes into the chamber G through pipe 88 and out of such chamber to the compartment 70 through the pipe 89.

In the compartment 70 the washing and leaching fluid from the chamber G mingles with the repulped or agitated sludge and passes from such compartment with the sludge through pipe 72 into chamber F. From the chamber F the heavily-enriched fluid passes through pipe 90 into a compartment 91 in the distributing tank 71. An exit pipe 92 from the compartment 91 conducts the enriched fluid to be processed to recover the dissolved values.

It will be apparent that there is practically a continuous flow of sludge through the chambers F, G, H and I in the order named, and that simultaneously there is a continuous flow of washing or leaching fluid through the chambers I, H, G and F in the order named. That is, the flow of fluid is counter to the direction of flow—or feed—of the sludge. Also, it will be apparent that the nearly-spent sludge is subjected to the action of practically barren fluid, and which fluid becomes gradually richer at each successive chamber, finally being discharged in maximum enriched condition at the uppermost of the plurality of superposed decantation chambers.

During the operation of the apparatus shown in Fig. 4, the seal is maintained between the primary thickener chamber E, and the first decantation chamber F in the manner described in connection with the apparatus shown in Fig. 2.

It is sometimes desirable to have more than one primary thickening chamber besides the chamber E shown in Fig. 4. Also, it is desirable to have such thickening chambers superposed and separate from each other. It is therefore necessary to provide, not only means for providing a seal between the primary thickening chamber adjacent to the uppermost decantation chamber, but also a seal between the respective primary thickening chambers.

Figure 3:
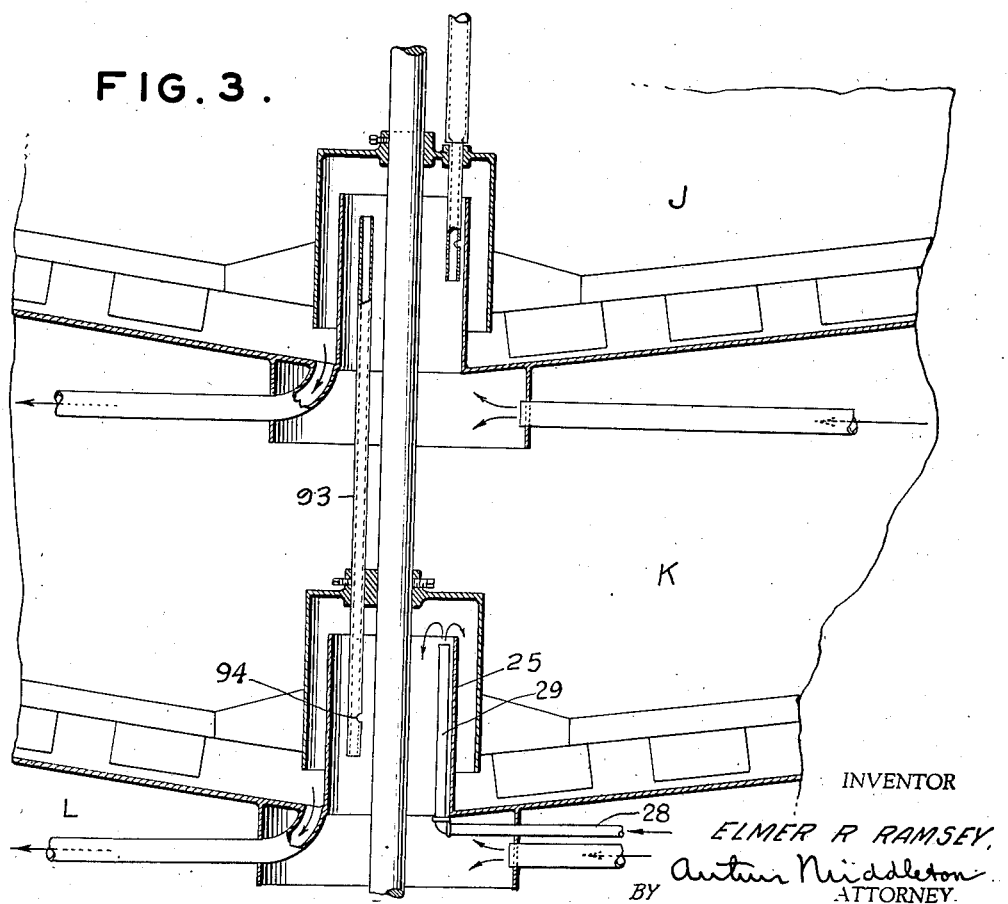
Figure 3 is a sectional view through the two uppermost compartments of a tray thickener showing a modified form of compartment sealing means whereby two compartments are sealed from others and from one another.

Such an arrangement is illustrated in Fig. 3, where J and K designate two primary thickening chambers arranged in superposed relation to each other and L a decantation chamber arranged beneath and in superposed relation to the chamber K. In Fig. 3 a seal is shown between the primary thickening chambers J and K, and a similar seal is shown between the primary thickening chamber K and the decantation chamber L. The main portions of such seals are identical with the seal illustrated in Fig. 2 and heretofore described. Therefore in the interest of clarity like parts in Figs. 2 and 3 have been designated by like reference characters. In Fig. 3 it will be noted that the pipes 28 and 29 through which is fed compressed air for the seal, is associated only with the seal between the compartments K and L. Also, there is a pipe 93 in the lower seal structure, the lower end of which is the counterpart of the pipe 32 having a hole 94 for determining the lowermost level of the sludge in the upstanding boot 25. This passes upward into the upstanding boot 25 forming part of the seal structure between chambers J and K and acts as the means for feeding compressed air to the uppermost seal structure.

The manner of operation of an apparatus employing two superposed, independent primary thickening chambers in association with a plurality of superposed decantation chambers is illustrated in the flow sheet of Fig. 5. It is understood that the diagrammatic showing of the apparatus of Fig. 5 is illustrative only, and merely for the purpose of illustrating the novel method.

In Fig. 5 the tank 96 is divided by the trays 97, 98, 99 and 100 into a plurality of superposed compartments M, N, O, P and Q, the uppermost one of which, M, is open and provided with a peripheral launder 101 into which supernatant fluid is collected and passes therefrom at 102 to be processed.

The chambers M and N are primary thickening chambers and are maintained separate and independent from each other by sealing structure similar to the sealing structure between the chambers J and K in Fig. 3 and above described. Between the primary thickening chamber N and the uppermost decantation chamber O is arranged a sealing structure similar to the sealing structure shown interposed between the chambers K and L of Fig. 3.

The sludge or solid is fed into the chamber M through pipe 102 and into the chamber N through a branch pipe 103, and also through a pipe 104 leading from agitators 105 and 106 arranged in series. Supernatant fluid in chamber M is drawn from the peripheral launder by pipe 102 and supernatant fluid in chamber N is drawn therefrom through pipe 107. All of the chambers are provided with raking structures which rake or feed the settled sludge to the centers of the bottom of such chambers.

The settled sludge is drawn from chamber M through pipe 108 by pump 109 and pumped into the agitators 105 and 106 where it is repulped and passed through pipe 104 to the chamber N. The settled sludge in chamber N is drawn through pipe 110 by pump 111 and pumped into the agitator 112 where it is mechanically repulped as by the agitating elements 112ª and fed through pipe 113 into the uppermost decantation chamber O. From the chamber O the sludge is fed successively through the decantation chambers P and Q and thence into the conical sump 114 from which it is drawn through the pipe 115.

During this feeding of the sludge downwardly through the chambers M, N, O, P and Q in the order named, washing or leaching liquid passes continuously through pipe 116 into chamber Q; from thence by pipe 117 to tank 118 and by pipe 119 to chamber P. From chamber P by pipe 120 into agitator 112, where it mingles with the repulped sludge and passes into chamber O through pipe 113. From chamber O the liquid passes through pipe 121 into agitators 105 and 106 and into chamber N through pipe 104. From chamber N the liquid flows through pipe 107 to be processed.

A principle of this machine can be visualized more clearly by considering in particular the three compartments N, O, P, as superposed compartments of a unit. They represent quiescent settling sections of which the first compartment N may be considered as the initial or upper compartment, the second compartment O as the intermediate compartment below the upper compartment, and the third as the lower compartment directly below the intermediate compartment.

It will then be observed that settled solids or sludge withdrawn or pumped from compartment N through the connection 110 and supernatant or overflow liquid from compartment P, coming through overflow conduit 120, are both subjected to a step of treatment such as mechanical mixing or repulping in the agitator 112. From the agitator 112 the mixture gravitates as feed through connection 113 through the intermediate compartment O. There the mixture separates again, with the supernatant liquid escaping through the overflow conduit 121, and settled solids or sludge gravitating from compartment O through a constantly-open sludge passageway in the bottom of compartment O into compartment P. A diluent liquid entering by way of the hydrostatic pressure column in the connection 119 is fed into compartment P to re-dilute or wash the sludge that passes into compartment P.

It will thus be seen that the compartment N is functionally separated from the next lower or intermediate compartment O by reason of a sludge trap section in the passageway between compartments N and O (more clearly shown in connection with the compartments E and F in Fig. 4) in the passageway between compartments N and O, which trap section is adapted to hold a body of sludge functioning as a sealing medium for normally deterring the direct transfer of sludge through this passageway, but under abnormal conditions to yieldably permit gravitational transfer of sludge therethrough. The function of this sludge seal between compartments N and O makes it possible to withdraw settled solids from compartment N for treatment in the agitator 112 with diluent liquid obtained from compartment P, and the return of the mixture from the agitator 112 to feed the intermediate compartment O from where settled solids pass in counter-current washing fashion directly down into compartment P for re-dilution.

In the method as just described the sludge passes successively downward through the superposed chambers and is subjected to the action of washing or leaching fluid which moves in a direction counter to the movement of the sludge.

While the particular embodiments above described are illustrative of the invention, it will be apparent that the invention may be embodied in a number of forms without departing from the spirit and scope of the invention, and the invention is not to be limited to any particular embodiment other than as pointed out in the appended claims.

I claim:

1. In an apparatus for settling the solids from a liquid solids suspension, a tank structure divided into superposed compartments and comprising a lower compartment and an upper compartment vertically superposed immediately above the lower compartment, each compartment adapted to have a sludge bed formed therein from the settling solids, means for overflowing supernatant liquid for each compartment, conduit means constituting a passage from the upper to the lower compartment and characterized by a change substantially from one vertical direction to the opposite vertical direction and therefore adapted in the normal operation of the apparatus to have trapped therein a substantially stationary body of settled solids; means for feeding liquid solids suspension to the upper compartment; means for feeding liquid solids suspension to the lower compartment; means for withdrawing settled solids material from the bottom of said upper compartment to a point outside the tank; means for withdrawing settled solids material from the lower compartment, and means for supplying a gaseous fluid under pressure to said passage in order and in a manner to interpose a gaseous medium between the settled solids of the upper compartment and the liquid of the lower compartment.

2. Apparatus according to claim 1, in which the passage leads through the bottom separating both compartments and comprises a rising well portion and a bell portion overlying and surrounding said well portion, with the addition of a pipe for supplying the gaseous fluid under pressure to be trapped under said bell portion in a manner to establish a gaseous medium interposed between the settled solids in the upper compartment and the liquid in the lower compartment.

3. Apparatus according to claim 1 in which the passage leads through the bottom separating both compartments and comprises a rising well portion and a bell portion overlying and surrounding said well portion; with the addition of a vertical rotary settled solids raking shaft extending through said passage and rotatable with said bell portion, means for rotating said shaft, and a pipe for supplying air under pressure to be trapped under said bell portion in a manner to establish a gaseous medium interposed between the settled solids in the upper compartment and the liquid in the lower compartment.

4. Apparatus according to claim 1, with the addition of a vent pipe associated with said passage and effective to allow escape of gaseous fluid forced into said passage at a predetermined lower limit of the liquid level therein.

5. Apparatus according to claim 1, with the addition of means for mixing settled solids withdrawn from the upper compartment with a diluent, and means for feeding the mixture to said lower compartment.

6. Apparatus according to claim 1, with the addition of means for mechanically re-pulping settled solids withdrawn from the upper compartment with a diluent, and means for feeding the re-pulped mixture to said lower compartment.

7. A unit for continuously treating a liquid-solids suspension, comprising in combination; sedimentation means providing three relatively quiescent superposed settling sections of which one serves as an initial compartment, another as an intermediate compartment and another as a third compartment;. for each compartment outflow weir means over which supernatant liquid outflows with the weirs disposed as to elevation so that that of the initial compartment is the lowest while that of the third compartment is the highest; conduit means providing a selectively operable passageway leading from the lower interior portion of the initial compartment to the intermediate compartment, a trap section in said conduit means adapted to hold a body of sludge functioning as a sealing medium for normally deterring the transfer of sludge through said selectively operable passageway but for under abnormal conditions yieldably permitting gravitational transfer of sludge therethrough; means for feeding liquid-solids suspension to the initial compartment; mixing station means functionally separated from the liquid-holding zones of said compartments, and provided with mechanical agitating means; pumping means for withdrawing sludge from the lower interior portion of said initial compartment including a discharge line delivering said pumped sludge into the mixing station; the outflow means for conducting supernatant liquid from said third compartment being disposed for gravitationally transferring and delivering liquid overflowing the weir thereof into said mixing station, said overflowing liquid and said pumped sludge thus becoming subjected to agitation by said mechanical agitating means; means for gravitationally transferring the resulting diluted liquid-solids suspension from said mixing station means into the intermediate compartment; conduit means providing a constantly open sludge passageway leading from the interior portion of said intermediate compartment to the third compartment for continuous normal gravitational transfer therethrough of sludge settled within the intermediate chamber; means for passing from the lower portion of said third compartment sludge settled within the third compartment; and means for feeding diluent under pressure into said third compartment and disposed for delivering the pressure liquids supplied thereby into the intermediate vicinity of the sludge normally passing from the intermediate compartment to said constantly open sludge passageway leading to the third compartment.

8. In operative combination in a unit for continuously treating a liquid-solids suspension, a tank structure divided into at least three superposed relatively quiescent settling compartments adapted to have sludge beds formed therein from the settling solids and so as to provide an upper compartment, an intermediate compartment below the upper compartment, and a third compartment below the intermediate compartment; each compartment having sludge raking means for progressively impelling settled solids toward sludge outlets, and outflow means including weirs over which supernatant liquid passes on its way from the compartments; an emergency sludge-transfer passageway leading from the lower interior portion of the upper compartment to the intermediate compartment including a solids trapping section adapted for holding a body of substantially stationary sludge constituting a yieldable seal normally closing said emergency passageway; means for feeding liquid-solids suspension to the upper compartment; mixing station means functionally separated from the quiescent settling zones of said compartments, and provided with mechanical agitating means; means for conveying settled solids in the form of sludge from the lower interior portion of said upper compartment into said mixing station; the outflow means for conducting supernatant liquid from said said third compartment over the weir thereof being disposed for delivering the liquid passing therethrough to said mixing station whereby said liquid functions as a diluent for the sludge in the mixing station, the diluent liquid and the sludge thus becoming subjected to agitation by said mechanical agitating means; means for gravitationally feeding the resulting mixture from the mixing station means to the intermediate compartment; conduit means providing a constantly open sludge-transfer passageway from said intermediate compartment into the third compartment; means for forcibly feeding a diluent into said third compartment; and means for passing settled solids in the form of sludge from the lower portion of said third compartment.

ELMER R. RAMSEY.